United States Patent
Shimada (10) Patent No.: US 10,862,175 B2
(45) Date of Patent: Dec. 8, 2020

(54) BATTERY FUEL GAUGE CIRCUIT

(71) Applicant: ROHM CO., LTD., Kyoto (JP)

(72) Inventor: Kazuaki Shimada, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 40 days.

(21) Appl. No.: 15/989,415

(22) Filed: May 25, 2018

(65) Prior Publication Data

US 2018/0342774 A1 Nov. 29, 2018

(30) Foreign Application Priority Data

May 29, 2017 (JP) .................................. 2017-105482
Apr. 26, 2018 (JP) .................................. 2018-085778

(51) Int. Cl.
*H02J 7/00* (2006.01)
*H01M 10/42* (2006.01)

(52) U.S. Cl.
CPC ..... *H01M 10/4285* (2013.01); *H01M 10/425* (2013.01); *H01M 2010/4271* (2013.01)

(58) Field of Classification Search
USPC ....................................................... 320/149
See application file for complete search history.

(56) References Cited

U.S. PATENT DOCUMENTS

| | | | | |
|---|---|---|---|---|
| 2005/0007068 A1* | 1/2005 | Johnson | .................... | B25F 5/02 |
| | | | | 320/110 |
| 2009/0278701 A1* | 11/2009 | Reams | .................... | G08C 17/00 |
| | | | | 340/636.15 |
| 2012/0306450 A1* | 12/2012 | Nakayama | .............. | G06F 1/263 |
| | | | | 320/134 |
| 2015/0115971 A1* | 4/2015 | Kim | ........................ | G06F 1/305 |
| | | | | 324/435 |
| 2016/0124051 A1* | 5/2016 | Prasad | ................. | G01R 31/367 |
| | | | | 324/426 |

FOREIGN PATENT DOCUMENTS

| CN | 129512 C | 12/2006 |
|---|---|---|
| CN | 1292527 C | 12/2006 |
| JP | 2002304940 A | 10/2004 |
| JP | 2004304940 A | 10/2004 |

OTHER PUBLICATIONS

JP410177457 (Year: 1998).*
Taiwanese Office Action corresponding to Application No. 107118254; Dated Nov. 14, 2019.
Taiwanese Notice of Allowance issued for corresponding Application No. 107118254. Dated Feb. 27, 2019.

* cited by examiner

*Primary Examiner* — Samuel Berhanu
(74) *Attorney, Agent, or Firm* — Cantor Colburn LLP (57) ABSTRACT

A battery fuel gauge circuit is coupled to a rechargeable battery. A first A/D converter samples a voltage $V_{BAT}$ of the battery. A logic circuit receives the output of the first A/D converter. The logic circuit acquires the output of the first A/D converter when an electronic device mounting the battery fuel gauge circuit is turned on for the first time.

7 Claims, 8 Drawing Sheets

BATTERY FUEL GAUGE CIRCUIT

CROSS REFERENCE TO RELATED APPLICATIONS

The present application claims priority under 35 U.S.C. § 119 to Japanese Patent Application No. 2017-105482, filed on May 29, 2017 and Application No. 2018-085778, filed on Apr. 26, 2018, the entire content of which are incorporated herein by reference.

BACKGROUND OF THE INVENTION

1. Field of the Invention

The present invention relates to a battery management system.

2. Description of the Related Art

Various kinds of battery-driven electronic devices such as cellular phone terminals, digital still cameras, tablet terminals, portable music players, portable game machines, and laptop computers include a built-in chargeable battery (secondary battery). Electronic circuits such as a CPU (Central Processing Unit) adapted to system control operation and signal processing, a liquid crystal panel, a wireless communication module, and other kinds of analog circuits and digital circuits, each operate receiving power supplied from the battery.

Figure 1:
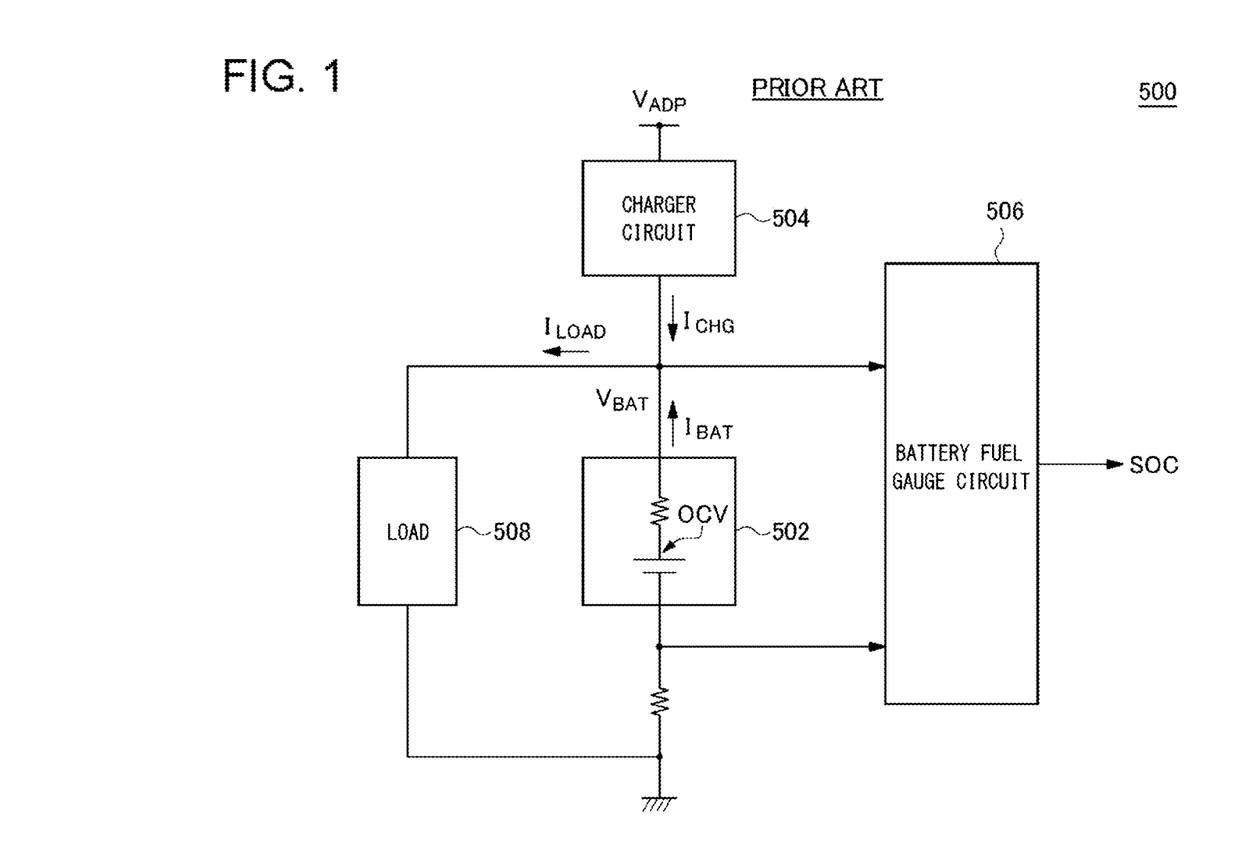
FIG. 1 is a block diagram showing a battery-driven electronic device.

FIG. 1 is a block diagram showing a battery-driven electronic device. An electronic device 500 includes a battery 502 and a charger circuit 504 that charges the battery 502. The battery 502 is configured as a rechargeable secondary battery. The charger circuit 504 receives a power supply voltage $V_{ADP}$ from an external power supply adapter or USB (Universal Serial Bus), and charges the battery 502.

The battery 502 is coupled to a load 508. A current $I_{BAT}$ that flows through the battery 502 is configured as a difference between a charging current $I_{CHG}$ supplied from the charger circuit 504 and a load current (discharging current) $I_{LOAD}$ that flows through the load 508.

Such a battery-driven electronic device has a function of detecting the remaining battery charge (state of charge: SOC) as an indispensable function. The electronic device 500 is provided with a battery fuel gauge circuit 506. The battery fuel gauge circuit 506 is also referred to as a "fuel gauge IC (Integrated Circuit)". As a detection method for detecting the remaining battery charge provided by the battery fuel gauge circuit 506, two methods, i.e., (1) the voltage method and (2) the coulomb counting method (charge integration method), have become mainstream. In many cases, a combination of them is employed. In some cases, the battery fuel gauge circuit 506 is built into the charger circuit 504.

In the voltage method, the open circuit voltage (OCV) of the battery is measured in an open circuit state (no-load state). The remaining battery charge is estimated based on the correspondence between the OCV and the SOC. The measurement of OCV requires the battery to be in a no-load state and in a relaxed state. Accordingly, the OCV cannot be measured with sufficient precision when the battery is charged or discharged.

In the coulomb counting method, the charging current that flows into the battery and the discharging current that flows from the battery (which will collectively be referred to as "charging/discharging current" hereafter) are integrated, so as to calculate the amount of charge supplied to the battery and the amount of charge discharged from the battery, thereby estimating the remaining battery charge. With the coulomb counting method, unlike the voltage method, the remaining battery charge can be estimated even in a period in which the battery is used and the open circuit voltage cannot be acquired.

In a case in which the SOC is calculated using the coulomb counting method, this method requires information with respect to the remaining battery charge (initial remaining battery charge) before the battery is charged or discharged. In many cases, the initial remaining battery charge is detected using the voltage method, which requires measurement of the OCV.

When the user uses a product for the first time after the product is shipped, there is a need to calculate the SOC with high precision. Accordingly, the present inventor has investigated the following control operation. It should be noted that this control operation is by no means regarded as a conventional technique.

1. When a battery is mounted on (or otherwise installed into) an electronic device for the first time before (or otherwise after) the product is shipped, a battery fuel gauge circuit 506 measures the OCV, and holds the measurement value in a register.

2. When the user turns on a power supply for the first time, the initial value of the SOC (initial SOC) is estimated based on the voltage method using the OCV stored in the register. Subsequently, the SOC is updated based on the coulomb counting method.

With this control operation, if a long time elapses from a time point at which the OCV is measured in a state in which the battery is mounted up to a time point at which the user turns on the power supply for the first time, this leads to an increase in error in the initial SOC because the battery discharges during this period of time.

SUMMARY OF THE INVENTION

The present invention has been made in order to solve such a problem. Accordingly, it is an exemplary purpose of an embodiment of the present invention to provide a battery fuel gauge circuit that is capable of detecting the initial remaining battery charge with high precision.

An embodiment of the present invention relates to a battery fuel gauge circuit to be coupled to a battery. The battery fuel gauge circuit comprises: a first A/D converter structured to sample a voltage of the battery; and a logic circuit coupled to receive an output of the first A/D converter. The logic circuit acquires the output of the first A/D converter when a power supply for a device mounting the battery fuel gauge circuit is turned on for the first time.

With this embodiment, even if a long period of time has elapsed from the shipping of the product up to the turning-on of the power supply performed by the user, this arrangement is capable of acquiring the initial remaining battery charge with high precision.

Also, the first A/D converter may sample the voltage of the battery for every predetermined sampling period. When the power supply for the device is turned on for the first time, the logic circuit may acquire the voltage of the battery sampled immediately before or otherwise immediately after the first-time turning-on.

Also, the first A/D converter may sample the voltage of the battery for every predetermined sampling period. Also, when the power supply for the device is turned on for the first time, the logic circuit may acquire an average value of the multiple voltage values of the battery sampled immediately before the first-time turning-on of the power supply. By calculating the average value, this arrangement is capable of reducing the effects of noise or the like.

Also, after the power supply is turned on for the first time, the sampling operation of the first A/D converter for every sampling period may be suspended.

Also, the sampling period may be set within a range from 2 ms to 50 ms.

Also, the battery fuel gauge circuit may further comprise a second A/D converter structured to sample a current of the battery. Also, the logic circuit may integrate an output of the second A/D converter.

Also, the logic circuit may be coupled to a processor via an interface. Also, the logic circuit may be capable of transmitting the voltage value of the battery sampled by the first A/D converter and an integrated value of the output of the second A/D converter to the processor.

Another embodiment of the present invention relates to an electronic device. The electronic device may comprise: a power supply button; a battery; and any one of the aforementioned battery fuel gauge circuits each structured to monitor a state of the battery.

It should be noted that any desired combinations of the aforementioned components and the components or representation of the present invention may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting a voltage signal, current signal, or resistor, also represent the corresponding voltage value, current value, or resistance value.

Figure 2:
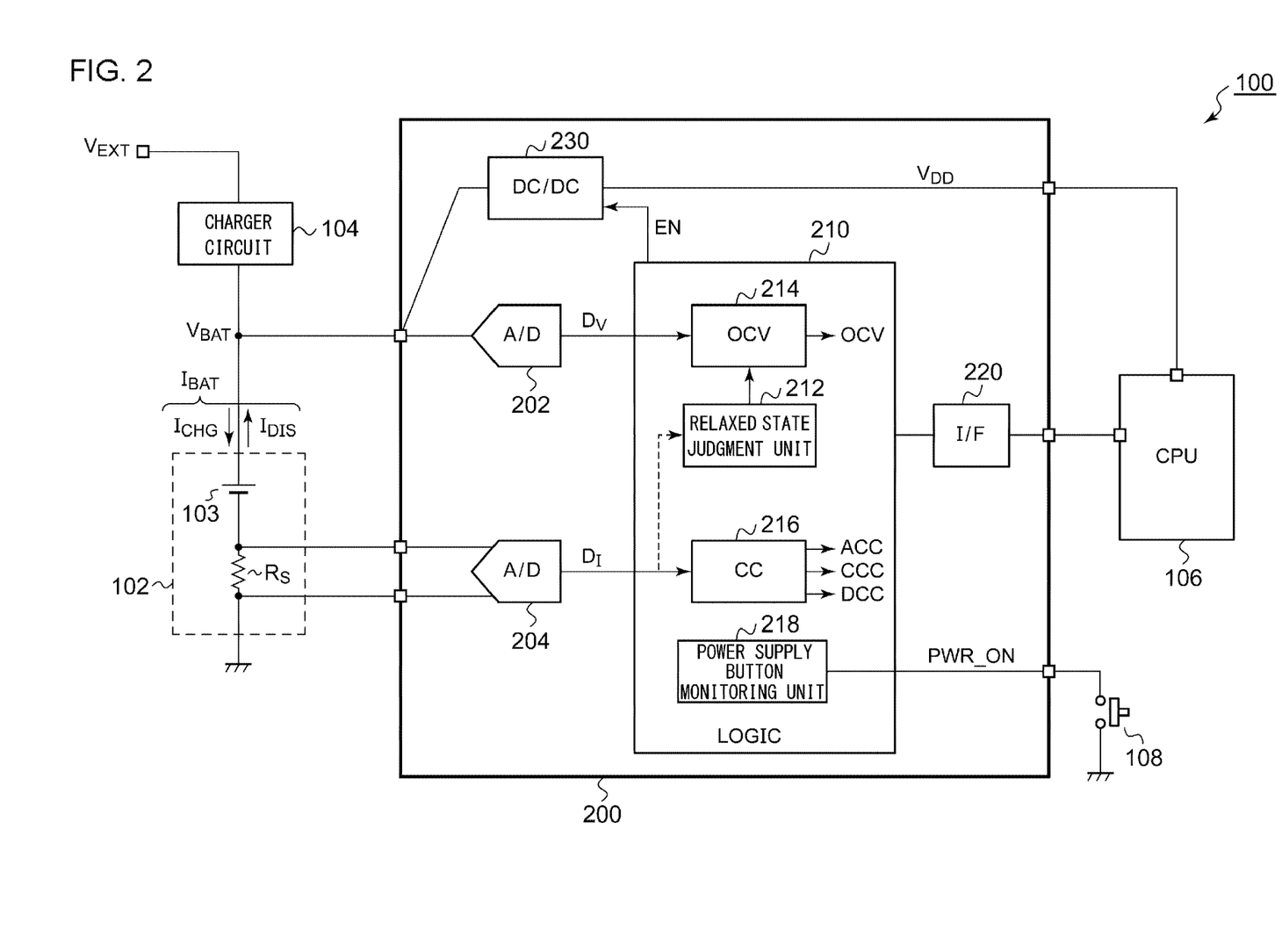
FIG. 2 is a block diagram showing an electronic device including a battery fuel gauge circuit according to an embodiment.

FIG. 2 is a block diagram showing an electronic device 100 including a battery fuel gauge circuit 200 according to an embodiment. Examples of such a battery-driven electronic device 100 include a smartphone, tablet terminal, digital still camera, digital video camera, portable audio player, laptop computer, etc. However, the battery-driven electronic device 100 is not restricted to such arrangements.

The electronic device 100 includes a battery 102, a charger circuit 104, a CPU (Central Processing Unit) 106, a power supply button 108, and a battery fuel gauge circuit 200. The battery 102 includes one or multiple cells 103. The kind of the cells 103 is not restricted in particular, and examples thereof include lithium-ion cells, lithium-air cells, lithium metal-based cells, nickel-metal hydride cells, nickel-cadmium cells, nickel-zinc cells, etc. The number of the cells 103 depends on the usage of the electronic device 100. In a case in which the electronic device 100 is configured as a portable electronic device, the battery 102 is designed to have one to several cells 103. In an in-vehicle battery, industrial equipment, or industrial apparatus, the number of the cells 103 is designed to be on the order of several dozen to several hundred. In the usage of the present invention, the configuration of the battery 102 is not restricted in particular.

The charger circuit 104 receives a power supply voltage $V_{EXT}$ from a DC power supply such as an external power supply adapter, USB (Universal Serial Bus), or the like, and charges the battery 102. The CPU 106 is one of the typical loads of the battery 102. The CPU 106 controls the overall operation of the electronic device 100. The power supply button 108 is provided in order to allow the electronic device 100 to be turned on and off.

The battery fuel gauge circuit 200 acquires information required to detect the state of charge (SOC) of the battery 102. The battery fuel gauge circuit 200 includes a first A/D converter 202, a second A/D converter 204, a logic circuit 210, an interface circuit 220, and a DC/DC converter 230, and is configured as a function IC integrated on a single semiconductor substrate. The first A/D converter 202 samples (i.e., A/D converts) the voltage $V_{BAT}$ of the battery 102. For example, the first A/D converter 202 may be configured as a successive approximation (SAR) A/D converter.

The second A/D converter 204 samples the current $I_{BAT}$ of the battery 102. The second A/D converter 204 may be configured as a delta-sigma A/D converter. The current $I_{BAT}$ includes the charging current and the discharging current. For example, the battery 102 includes the cell 103 and a sensing resistor $R_S$ coupled in series. The second A/D converter 204 detects the battery current $I_{BAT}$ based on a voltage drop that occurs across the sensing resistor $R_S$.

The logic circuit 210 is a controller for the battery fuel gauge circuit 200. The logic circuit 210 receives the output (digital voltage detection value $D_V$) of the first A/D converter 202 and the output (digital current detection value $D_I$) of the second A/D converter 204.

The interface circuit 220 is provided in order to transmit data from the logic circuit 210 to the CPU 106, and to receive data and instructions from the CPU 106. For example, as the interface circuit 220, an I²C (Inter IC) interface may be employed.

The DC/DC converter 230 receives the battery voltage $V_{BAT}$, and steps down the battery voltage $V_{BAT}$ thus received, so as to generate a power supply voltage $V_{DD}$. The power supply voltage $V_{DD}$ is supplied to the CPU 106. It should be noted that unshown inductors and smoothing capacitors, which are components of the DC/DC converter 230, are configured as external components of the battery fuel gauge circuit 200.

Next, specific description will be made regarding the function and operation of the logic circuit 210.

1. Measurement of Open Circuit Voltage (OCV)

When the battery current $I_{BAT}$ remains substantially zero over a sufficiently long period of time, a relaxed state judgment unit 212 of the logic circuit 210 judges that the battery 102 is in a relaxed state. An OCV acquisition unit 214 acquires the voltage detection value $D_V$ measured in the relaxed state as the OCV of the battery 102. The OCV value thus measured is used to estimate the SOC based on the voltage method.

2. Coulomb Counting Processing

The logic circuit 210 includes a coulomb counting processing unit 216. The coulomb counting processing unit 216 monitors the battery current $I_{BAT}$, and integrates the current value $D_I$ with the current (discharging current) $I_{BAT}$ that flows from the battery 102 as a positive current and with the current (charging current) $I_{BAT}$ that flows into the battery 502 as a negative current, so as to generate an accumulation coulomb count (ACC). The coulomb count value CC is calculated based on the following Expression using the battery current values $I_{BATi}$ measured in each sampling time period $t_i$ (i=1, 2, ... ).

$$ACC = \Sigma_{i=1}(\Delta t \times I_{BATi})$$

In a case in which the sampling period is constant, Δt is set to a constant.

Furthermore, the coulomb counting processing unit 216 may calculate the charge coulomb count value (CCC value) which is an integrated value of the charging current $I_{CHG}$ and the discharge coulomb count value (DCC value) which is an integrated value of the discharging current $I_{DIS}$. The CCC value and the DCC value can be used to control the number of charging cycles and the number of discharging cycles.

3. Monitoring of Power Supply Button 108

A power supply button monitoring unit 218 of the logic circuit 210 is coupled to the power supply button 108, and monitors whether or not the power supply button 108 is pressed by the user of the electronic device 100. When the power supply button 108 is pressed, the logic circuit 210 asserts (e.g., sets to the high level) an enable signal EN, and starts up the DC/DC converter 230. After the DC/DC converter 230 is started up, the power supply voltage $V_{DD}$ is supplied to the CPU 106. The electronic device 100 is started up according to the control operation of the CPU 106.

Furthermore, the power supply button monitoring unit 218 manages a flag FLG that indicates whether or not the pressing thus detected is the first-time pressing. The flag FLG is recorded in an internal component of the battery fuel gauge circuit 200 or otherwise in an external component thereof in a non-volatile manner. When the electronic device 100 is shipped, the flag FLG is set to an initial value (e.g., zero). When the power supply button 108 has been pressed for the first time, the power supply button monitoring unit 218 sets the value of the flag FLG to a value (e.g., 1) that differs from the initial value.

4. Measurement of Initial OCV

The OCV to be used as a reference to estimate the SOC based on the voltage method for the first time after the electronic device 100 is shipped will be referred to as the "initial OCV". When the power supply for the electronic device 100 has been turned on for the first time, the logic circuit 210 acquires the output $D_V$ of the first A/D converter 202 as the initial OCV.

Specifically, the OCV acquisition unit 214 monitors the flag FLG Upon detecting the turning-on of the power supply button 108 when the flag FLG indicates the initial value (0), the OCV acquisition unit 214 acquires the output $D_V$ of the first A/D converter 202.

The above is the function of the logic circuit 210. The normal OCV value, the initial OCV value, the ACC value, the CCC value, and the DCC value acquired by the logic circuit 210 are transmitted to the CPU 106 via the interface circuit 220. It should be noted that "are transmitted" includes an operation in which the CPU 106 reads out data stored in memory (a register) included in the battery fuel gauge circuit 200.

The CPU 106 executes a software program, and estimates and calculates the SOC based on the voltage method and the coulomb counting method.

Figure 3:
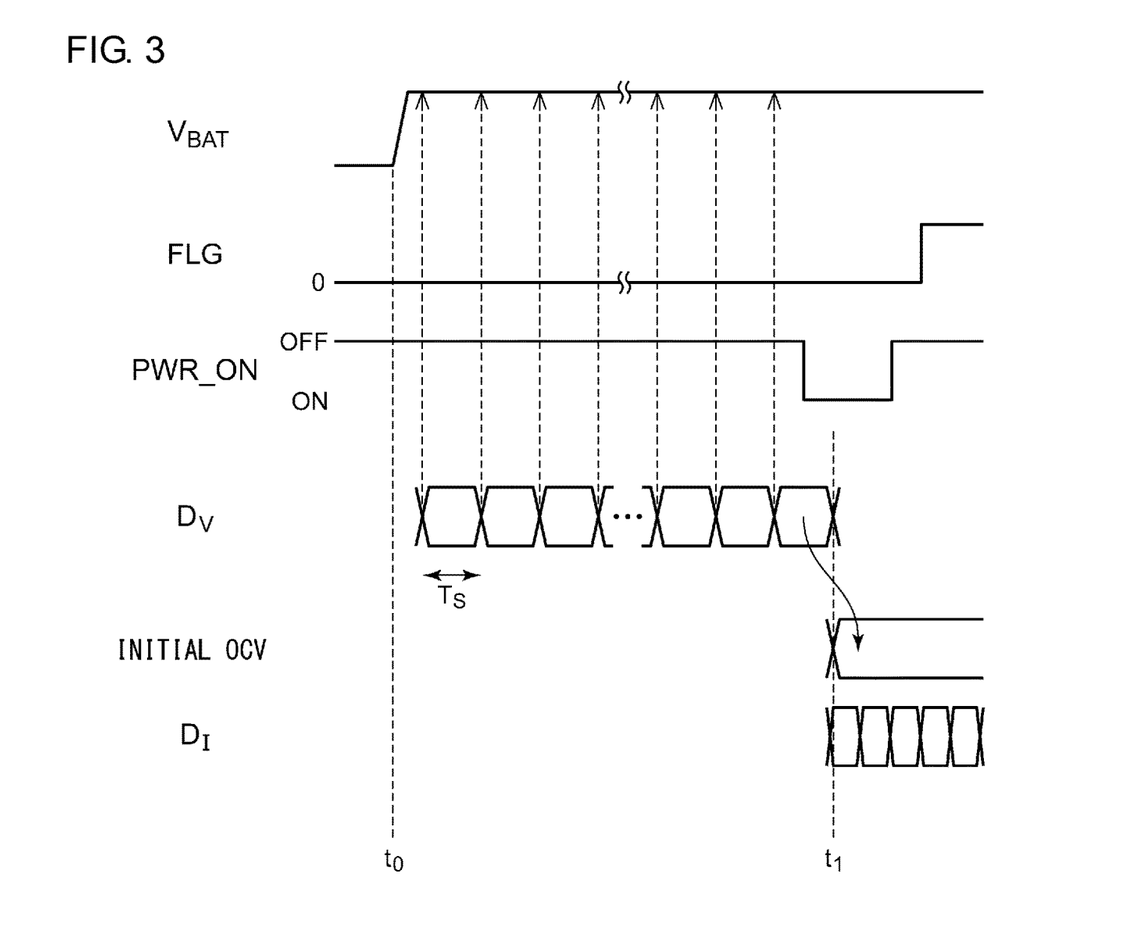
FIG. 3 is a diagram for explaining the measurement of the initial OCV performed by the battery fuel gauge circuit shown in FIG. 2.

The above is the configuration of the battery fuel gauge circuit 200. Next, description will be made regarding the operation of the battery fuel gauge circuit 200. FIG. 3 is a diagram for explaining the operation of the battery fuel gauge circuit 200 shown in FIG. 2 for measuring the initial OCV. When the battery 102 is mounted on the electronic device 100 at the time point to, the battery voltage $V_{BAT}$ is supplied to the battery fuel gauge circuit 200. In this state, the battery fuel gauge circuit 200 becomes operable. Subsequently, the electronic device 100 is shipped in a state in which the power supply is turned off. When the electronic device 100 is shipped, the flag FLG is initialized.

After the time point to, the first A/D converter 202 continuously samples the battery voltage $V_{BAT}$ for every predetermined sampling period $T_S$ (automatic sampling). In a case in which the sampling period $T_S$ is set to an excessively short period of time, this leads to an increase in power consumption. Accordingly, the sampling period $T_S$ is preferably set to several ms to several dozen ms, e.g., 2 ms to 50 ms. The sampling period $T_S$ can be further lengthened depending on the battery capacity and leak current of the electronic device. For example, in a case in which the electronic device has a battery capacity of 500 mAh and has an off-time leak current of 100 μA, variation in the battery state per hour is represented by 100 μA/500 mA, i.e., is only 0.02%. Accordingly, the sampling period $T_S$ may be lengthened up to a period on the order of one hour. Thus, the sampling period $T_S$ may be designed with a period that does not involve an increase in the circuit current due to the intermittent operation of the first A/D converter 202 as the lower limit, and with a period that does not involve a significant change in the remaining battery charge due to the leak current as the upper limit.

After the time point to, the power supply button monitoring unit 218 monitors the power supply button 108, and monitors whether or not the power supply has been turned on. The power supply button 108 is pressed at the time point $t_1$. During the period of time when the power supply button 108 is pressed, a PWR_ON signal is asserted (e.g., set to the low level). Upon detecting the assertion of the PWR_ON signal, the power supply button monitoring unit 218 instructs the OCV acquisition unit 214 to acquire the voltage detection value $D_V$ immediately before the assertion. During the period of time before the power supply is turned on (time point $t_1$) after the time point to, only a part of the battery fuel gauge circuit 200 (only the first A/D converter 202 and the power supply button monitoring unit 218) performs an intermittent operation. Accordingly, the battery current $I_{BAT}$ can be regarded as substantially zero. Thus, the battery 102 can be assumed to be in the relaxed state. That is to say, the voltage detection value $D_V$ thus acquired in this stage is used as the initial OCV value. Subsequently, the value of the flag FLG is changed.

The automatic sampling operation of the first A/D converter 202 with the sampling period $T_S$ is preferably suspended after the power supply is turned on for the first time. This allows unnecessary power consumption to be reduced.

The DC/DC converter 230 starts up in response to the turning-on of the power supply. In this stage, the power supply voltage $V_{DD}$ is supplied to the CPU 106, which enables the CPU 106 to operate. The CPU 106 receives the initial OCV value from the battery fuel gauge circuit 200. The CPU 106 estimates the initial SOC that corresponds to the initial OCV value based on a table or an expression that defines the correspondence between the OCV and the SOC.

After the DC/DC converter 230 and the CPU 106 start to operate, the battery current $I_{BAT}$ having a non-zero value flows from the battery 102, i.e., the battery becomes the non-relaxed state. Subsequently, in the battery fuel gauge circuit 200, the second A/D converter 204 and the coulomb counting processing unit 216 each become active. In this state, the coulomb count values ACC, CCC and DCC are calculated. The CPU 106 updates the SOC by calculation based on the initial SOC and the coulomb count value ACC.

Figure 4:
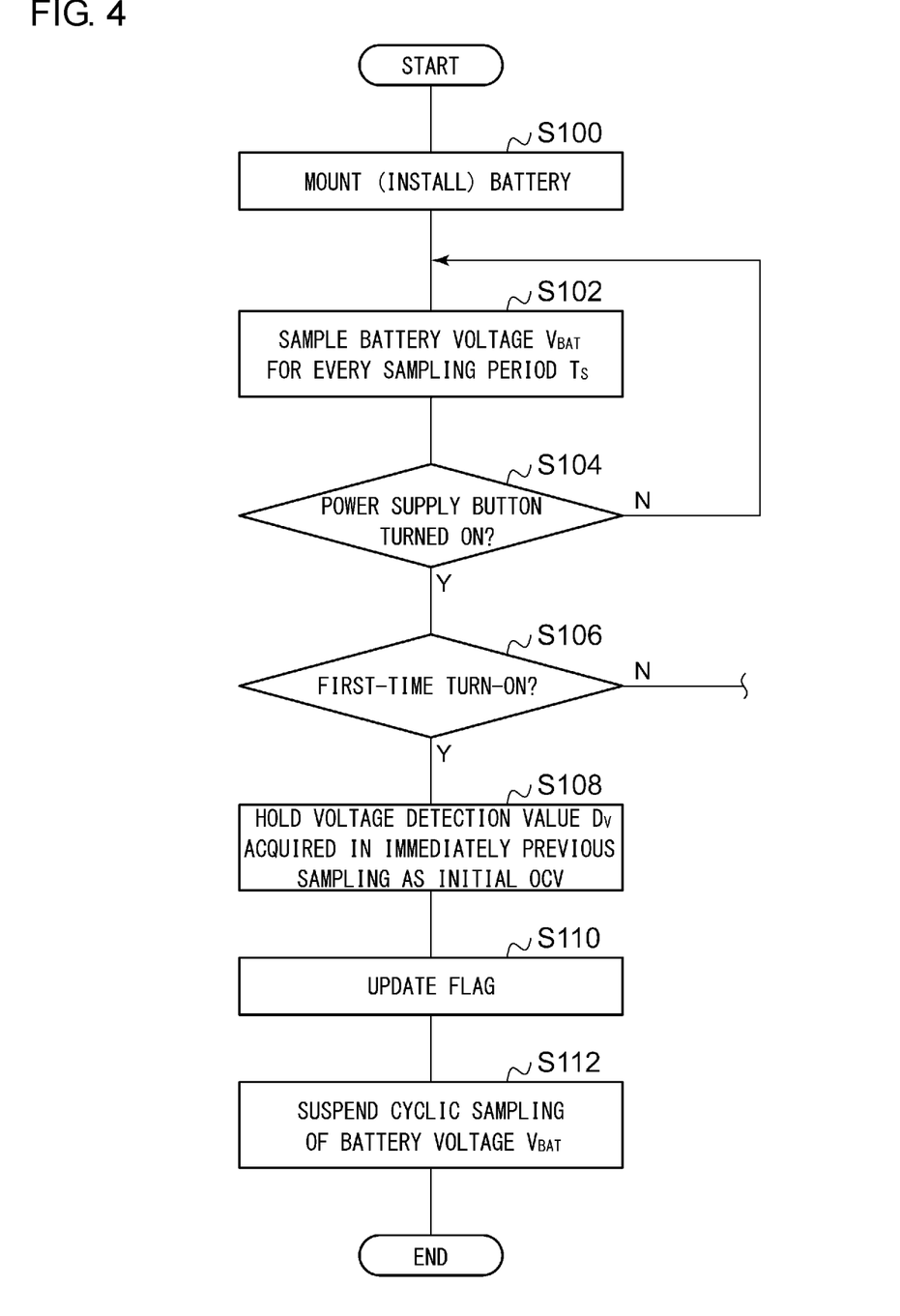
FIG. 4 is a flowchart for explaining the operation of the electronic device shown in FIG. 2.

FIG. 4 is a flowchart for explaining the operation of the electronic device 100 shown in FIG. 2. It should be noted that, in the flowchart, the order of each step may be exchanged as appropriate so long as no problem occurs. Also, multiple steps may be executed in parallel.

The battery 102 is mounted (or otherwise installed) (S100). This enables the battery fuel gauge circuit 200 to operate. The first A/D converter 202 starts sampling of the battery voltage $V_{BAT}$ (S102).

Whether or not the power supply button 108 has been pressed is monitored (S104). When the pressing of the power supply button 108 has not been detected (NO in S104), the sampling of the battery $V_{BAT}$ is maintained. Upon detecting that the power supply button 108 has been pressed (YES in S104), judgement is made regarding whether or not the turning-on thus detected is the first-time turning-on of the power supply (S106). When judgement has been made that the turning-on thus detected is the first-time turning-on of the power supply (YES in S106), the voltage detection value $D_V$ acquired in the immediately previous sampling is held as the initial OCV (S108). The flag FLG that indicates whether or not the power supply has been turned on for the first time is changed (S110), and the cyclic sampling operation of the first A/D converter 202 is suspended. When judgement has been made that the turning-on of the power supply thus detected is the second-time or subsequent turning-on of the power supply (NO in S106), the OCV measurement is performed based on the normal resting time.

The above is the operation of the battery fuel gauge circuit 200 and the electronic device 100. With the battery fuel gauge circuit 200, even in a case in which a long period of time ($t_0$ to $t_1$ shown in FIG. 3) has elapsed from the shipping of the product up to the turning-on of the power supply performed by the user, this arrangement is capable of acquiring the initial OCV with high precision, thereby detecting the initial remaining battery charge (initial SOC) with high precision.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification 1

Figure 5:
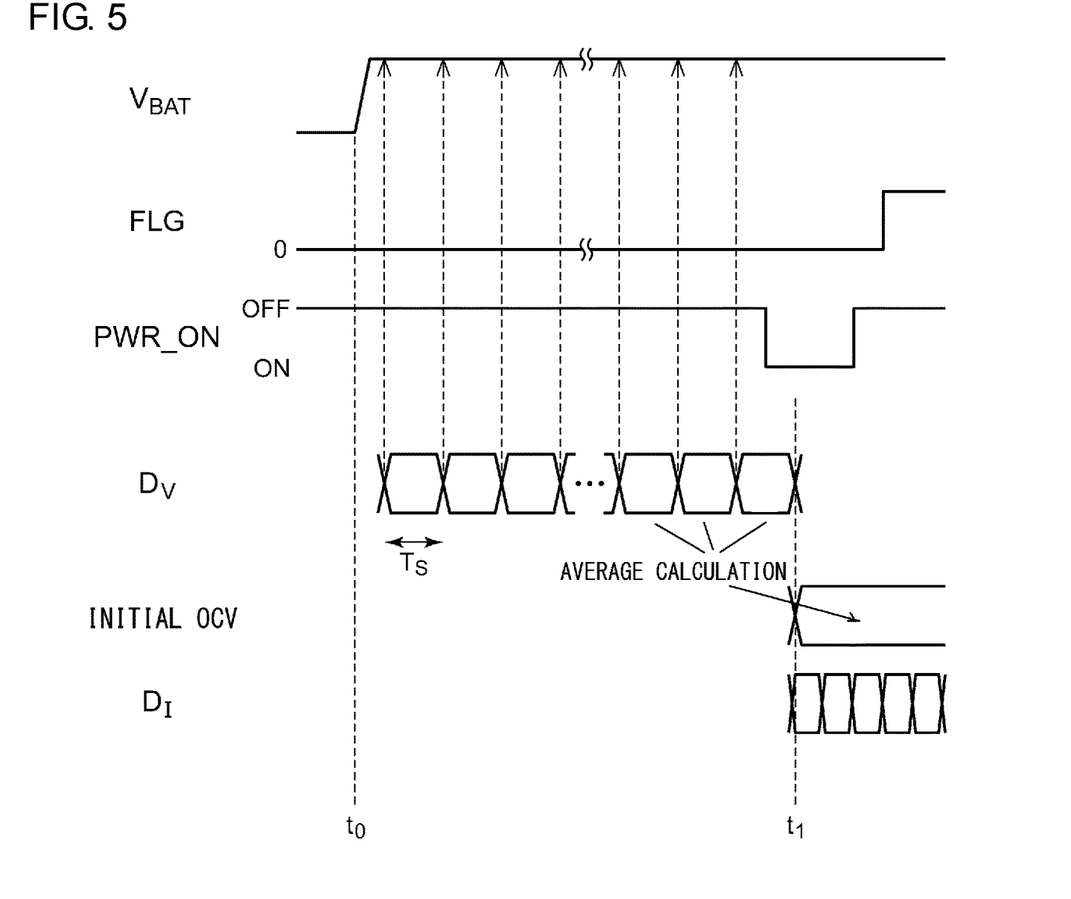
FIG. 5 is a diagram for explaining the measurement of the initial OCV according to a modification 1.

Description has been made in the embodiment regarding an arrangement as shown in FIG. 3 in which the single voltage detection value $D_V$ immediately before the turning-on of the power supply button (time point $t_1$) is used as the initial OCV. However, the present invention is not restricted to such an arrangement. FIG. 5 is a diagram for explaining the measurement of the initial OCV according to a modification 1. For example, an average of multiple voltage detection values $D_V$ measured immediately before the time point $t_1$ may be used as the initial OCV. As the average processing, simple average calculation or weighted average calculation may be employed. Alternatively, moving average calculation may be employed. Also, the voltage detection values $D_V$ to be used for the average calculation may be measured in a time-based series. Also, such data to be used for the average calculation may be extracted for every N (N≥2) data items.

Figure 6:
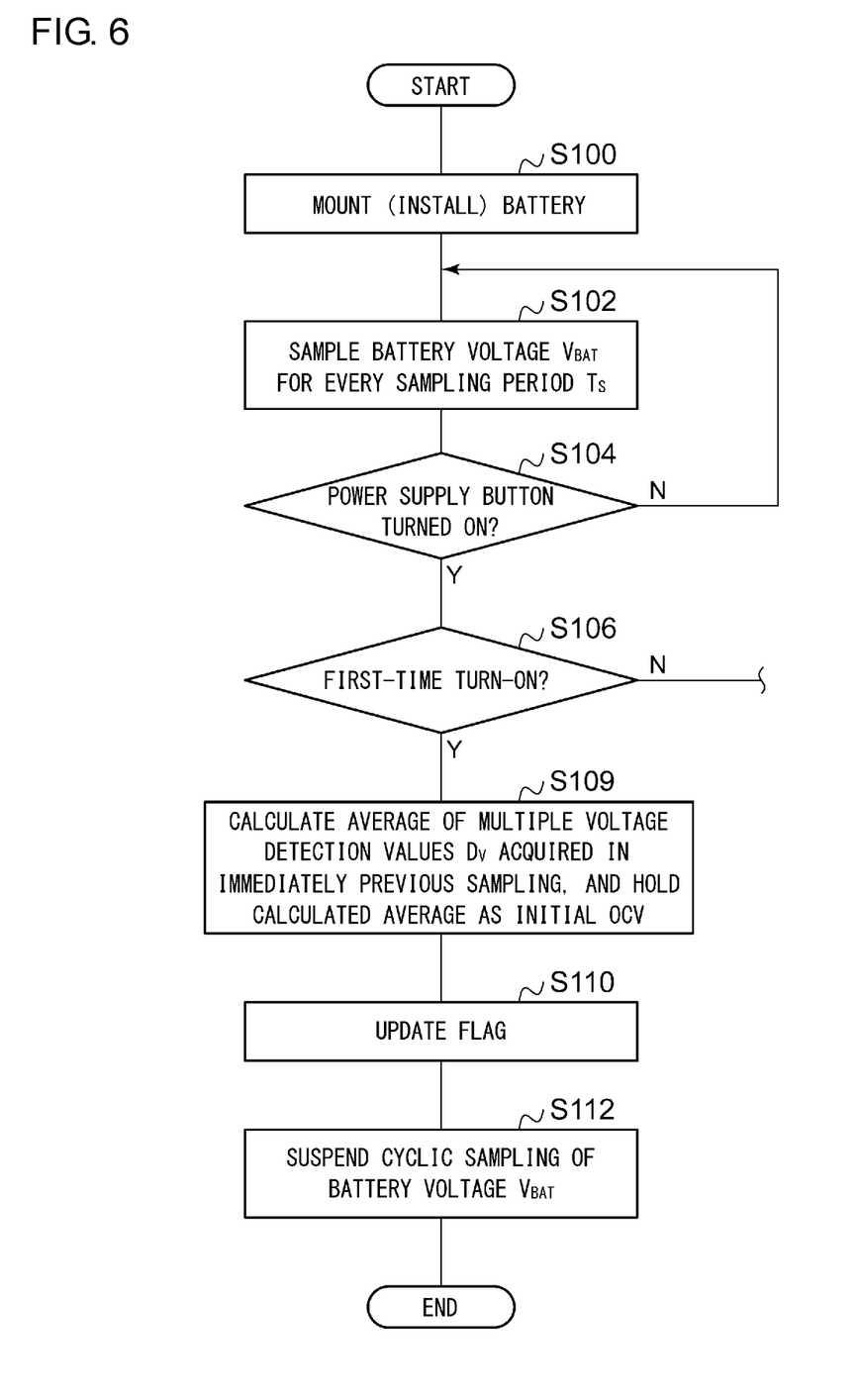
FIG. 6 is a flowchart for explaining the operation of the electronic device according to the modification 1.

FIG. 6 is a flowchart for explaining the operation of the electronic device 100 according to the modification 1. The step S108 shown in FIG. 4 is amended to step S109. When judgment has been made that the turning-on of the power supply thus detected is the first-time turning-on (YES in S106), the average value of the multiple voltage detection values $D_V$ acquired in the immediately previous sampling is held as the initial OCV (S109). In a case in which noise has occurred, in some cases, the output of the A/D converter fluctuates due to the effect of noise, leading to a problem in that the voltage detection value cannot be acquired with high precision. In order to solve this problem, by calculating an average value of the multiple measurement data acquired by multiple sampling operations, this arrangement is capable of reducing the effect of noise. It should be noted that the average processing may be performed after judgment has been made that the power supply has been turned on for the first time. Also, the average value may be updated every time the battery voltage $V_{BAT}$ is sampled in step S102.

Modification 2

Figure 7:
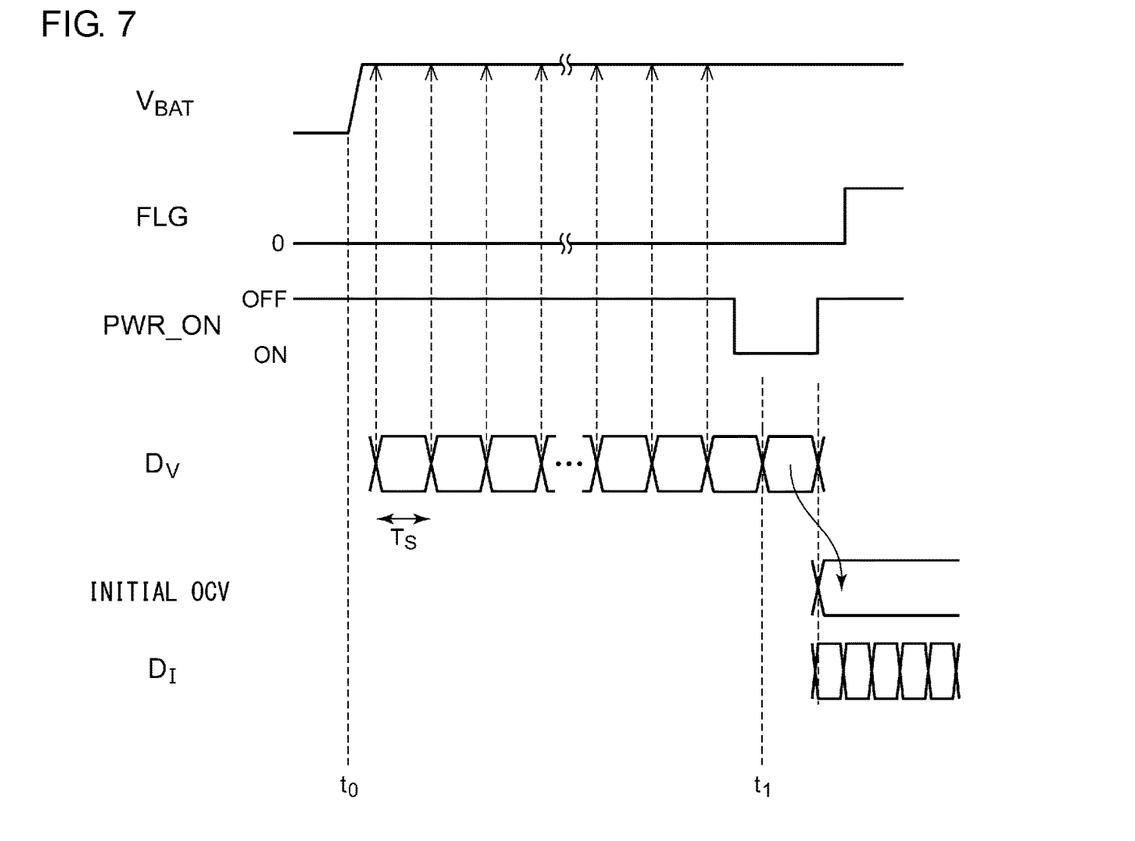
FIG. 7 is a diagram for explaining the measurement of the initial OCV according to a modification 2.

FIG. 7 is a diagram for explaining the measurement of the initial OCV according to a modification 2. In a case in which the battery 102 remains in the relaxed state immediately after the time point $t_1$, the voltage detection value $D_V$ measured immediately after the time point $t_1$ may be used as the initial OCV.

Figure 8:
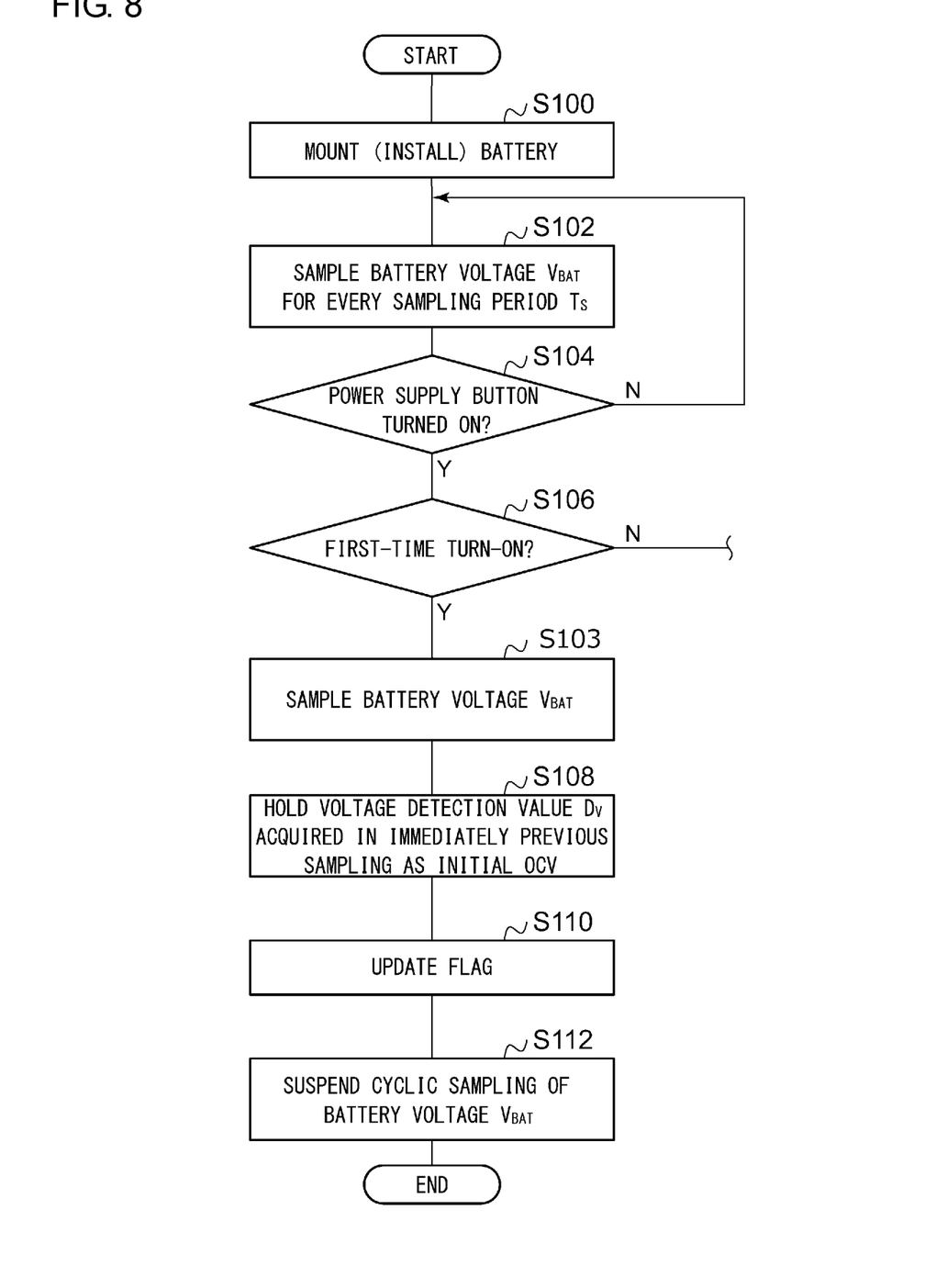
FIG. 8 is a flowchart for explaining the operation of the electronic device according to the modification 2.

FIG. 8 is a flowchart for explaining the operation of the electronic device 100 according to the modification 2. When judgment has been made that the turning-on of the power supply thus detected is the first-time turning-on (YES in S106), the battery voltage $V_{BAT}$ is sampled once more (S103). The voltage detection value $D_V$ thus acquired in the last sampling (S103) is held as the initial OCV (S108).

Modification 3

Description has been made in the embodiment regarding an arrangement in which a part of the estimation of the SOC and the calculation is executed by the CPU 106 configured as an external component of the battery fuel gauge circuit 200. However, the present invention is not restricted to such an arrangement. Also, a processor (calculation core) may be integrated on the battery fuel gauge circuit 200 in order to integrate a part of the functions of the CPU 106.

Modification 4

Description has been made in the embodiment regarding an arrangement in which the DC/DC converter 230 is integrated on the battery fuel gauge circuit 200. However, the present invention is not restricted to such an arrangement. The DC/DC converter 230 may be integrated on another power management IC (PMIC) that differs from the battery fuel gauge circuit 200.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. A battery fuel gauge circuit to be coupled to a battery, the battery fuel gauge circuit comprising:
   a first A/D converter structured to start sampling a voltage of the battery for every predetermined sampling period when the battery is mounted;
   a logic circuit coupled to receive an output of the first A/D converter and structured to start its operation when the battery is mounted; and
   a DC/DC converter structured to supply a power supply voltage to an external processor when it is enabled,
   wherein the logic circuit is structured to be coupled to a power supply button, to monitor whether or not the power supply button is pressed by a user, and wherein in response to every power on, the logic circuit output an enable signal so as to enable the DC/DC converter, and
   wherein in response to a first-time power on, the logic circuit acquires an average value of the voltages of the battery sampled a plurality of times immediately before the first-time power on and the logic circuit stores the average value as an initial open circuit voltage (OCV) of the battery.

2. The battery fuel gauge circuit according to claim 1, wherein, after the power supply is turned on for the first time, the sampling operation of the first A/D converter for every sampling period is suspended.

3. The battery fuel gauge circuit according to claim 1, wherein the sampling period is set within a range from 2 ms to 50 ms.

4. The battery fuel gauge circuit according to claim 1, further comprising a second A/D converter structured to sample a current of the battery,
   wherein the logic circuit integrates an output of the second A/D converter.

5. The battery fuel gauge circuit according to claim 4, wherein the logic circuit is coupled to a processor via an interface,
   and wherein the logic circuit is capable of transmitting the voltage value of the battery sampled by the first A/D converter and an integrated value of the output of the second A/D converter to the processor.

6. The battery fuel gauge circuit according to claim 1, monolithically integrated on a single semiconductor substrate.

7. An electronic device comprising:
   a power supply button;
   a processor;
   a battery; and
   a battery fuel gauge circuit,
   wherein the battery fuel gauge circuit comprises:
      a first A/D converter structured to start sampling a voltage of the battery for every predetermined sampling period when the battery is mounted;
      a logic circuit coupled to receive an output of the first A/D converter and structured to start its operation when the battery is mounted; and
      a DC/DC converter structured to supply a power supply voltage to the processor when it is enabled,
   wherein the logic circuit is structured to be coupled to a power supply button, to monitor whether or not the power supply button is pressed by a user, and wherein in response to every power on, the logic circuit output an enable signal so as to enable the DC/DC converter, and wherein in response to a first-time power on, the logic circuit acquires an average value of the voltages of the battery sampled a plurality of times immediately before the first-time power on and the logic circuit stores the average value as an initial open circuit voltage (OCV) of the battery.

* * * * *